United States Patent
Hedberg et al.

(10) Patent No.: US 6,695,734 B2
(45) Date of Patent: *Feb. 24, 2004

(54) POWER TRANSMISSION BELT

(75) Inventors: Carol Sue Hedberg, Lincoln, NE (US); Thomas George Burrowes, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/013,066

(22) Filed: Dec. 6, 2001

(65) Prior Publication Data

US 2002/0128105 A1 Sep. 12, 2002

Related U.S. Application Data

(60) Provisional application No. 60/257,891, filed on Dec. 21, 2000.

(51) Int. Cl.[7] ............... F16G 5/04; F16G 1/04
(52) U.S. Cl. ............... 474/263; 474/260; 474/265
(58) Field of Search ............... 474/263, 260, 474/262, 261, 268, 264, 205, 237; 524/492, 495, 526, 397; 156/137

(56) References Cited

U.S. PATENT DOCUMENTS

| | | | |
|---|---|---|---|
| 5,224,905 A | * | 7/1993 | Mishima .................. 474/258 |
| 5,250,010 A | * | 10/1993 | Mishima et al. ........... 474/263 |
| 5,610,217 A | | 3/1997 | Yarnell et al. ............. 524/397 |
| 6,132,328 A | * | 10/2000 | Kinoshita et al. ........... 474/260 |
| 6,255,379 B1 | * | 7/2001 | Hahn et al. ................. 524/492 |
| 6,352,488 B1 | * | 3/2002 | Morris et al. ............... 474/263 |
| 6,464,607 B1 | * | 10/2002 | Rosenboom et al. ........ 474/263 |

FOREIGN PATENT DOCUMENTS

| | | | |
|---|---|---|---|
| EP | 0440726 B1 | * | 1/1995 |
| EP | 1035353 A1 | * | 9/2000 |
| EP | 1108750 A1 | * | 6/2001 |
| EP | 1241379 A1 | * | 9/2002 |
| JP | 48-73488 | * | 10/1973 |

* cited by examiner

*Primary Examiner*—Marcus Charles
(74) *Attorney, Agent, or Firm*—John D. DeLong; Bruce J. Hendricks

(57) ABSTRACT

An endless single V-grooved power transmission belt having a tension section; a cushion section; and a load-carrying section disposed between the tension section and cushion section; and the belt containing a sulfur-cured elastomeric composition comprising 100 parts of a rubber derived from 25 to 100 parts by weight of natural rubber; 0 to 75 parts by weight of a second rubber selected from the group consisting of polychloroprene, synthetic polyisoprene, epichlorohydrin, acrylonitrile rubber, hydrogenated acrylonitrile rubber, styrene-butadiene rubber, styrene-isoprene rubber, isoprene-butadiene rubber, styrene-isoprene-butadiene rubber, 1,4-trans-polybutadiene, chlorosulfonated polyethylene, alkylated chlorosulfonated polyethylene, trans-polyoctenamer and mixtures thereof from 1 to 30 parts by weight per 100 parts by weight of total rubber (phr) of a polybutadiene adduct of maleic acid anhydride; and from 5 to 50 phr of fibers distributed throughout the elastomer composition.

12 Claims, 1 Drawing Sheet

POWER TRANSMISSION BELT

CROSS REFERENCES TO RELATED APPLICATIONS

The Applicants hereby incorporate by reference prior U.S. Provisional Application Ser. No. 60/257,891, filed on Dec. 21, 2000.

BACKGROUND OF THE INVENTION

Recent developments in the automotive industry have resulted in higher engine output in a more compact engine compartment. As a result, power transmission belts on these engines have been required to operate under higher load and at high tensions. Under such high load conditions on certain drives, belts can turn over in their pulleys, which is very undesirable and lead to premature failure. To meet such demands, it is desirable to increase the dynamic stiffness of the belts. Unfortunately, increasing the dynamic stiffness of the compound used in the belt tends to increase the tan delta values of the rubber compound. Therefore, there exists a need for a new and improved belt to meet the demand in the industry which exhibits good dynamic stiffness and good tan delta values.

SUMMARY OF THE INVENTION

The present invention relates to a single V-grooved power transmission belt that is characterized by a rubber composition containing a mixture of natural rubber and a polybutadiene adduct of maleic anhydride.

BRIEF DESCRIPTION OF THE FIGURES

The accompanying FIGURE shows embodiments of this invention in which

DETAILED DESCRIPTION OF THE INVENTION

Figure 1:
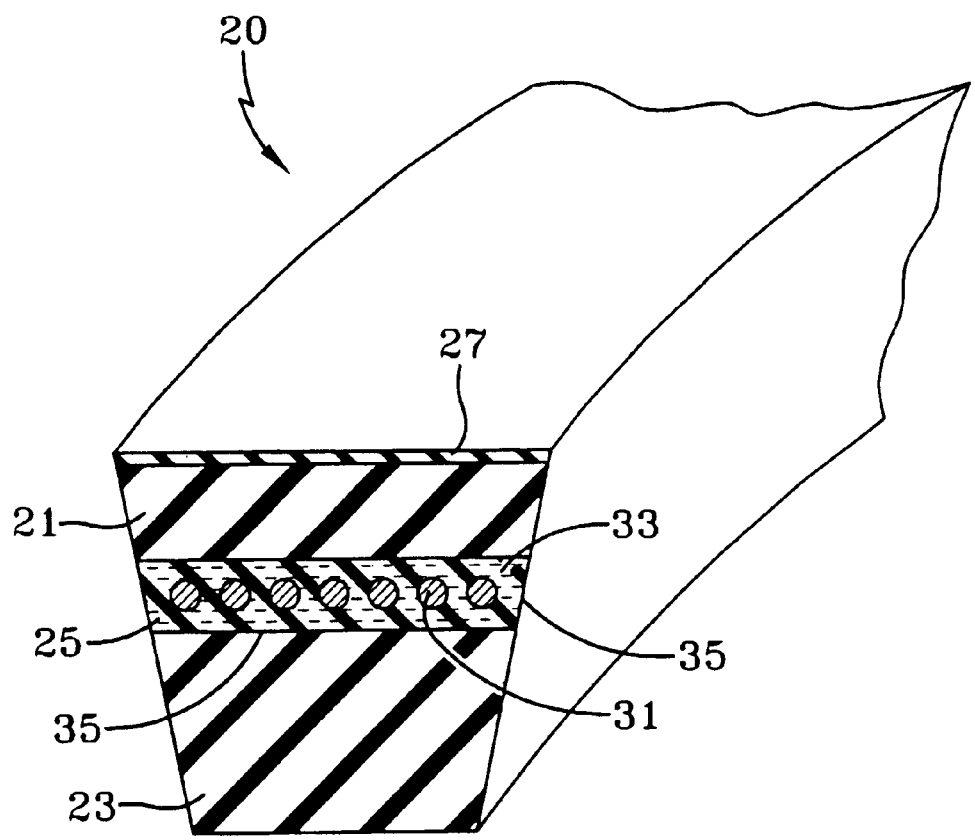
FIG. 1 is a fragmentary perspective view illustrating one embodiment of an endless power transmission belt of this invention.

There is disclosed an endless single V-grooved power transmission belt having
(A) a tension section;
(B) a cushion section; and
(C) a load-carrying section disposed between the tension section and cushion section; and the belt containing a sulfur cured elastomeric composition comprising
  (1) 100 parts of a rubber derived from
    (a) 25 to 100 parts by weight of natural rubber;
    (b) 0 to 75 parts by weight of a second rubber selected from the group consisting of polychloroprene, synthetic polyisoprene, epichlorohydrin, acrylonitrile rubber, hydrogenated acrylonitrile rubber, styrene-butadiene rubber, styrene-isoprene rubber, isoprene-butadiene rubber, styrene-isoprene-butadiene rubber, 1,4-trans-polybutadiene, chlorosulfonated polyethylene, alkylated chlorosulfonated polyethylene, trans-polyoctenamer and mixtures thereof;
  (2) from 1 to 30 parts by weight per 100 parts by weight of total rubber (phr) of a polybutadiene adduct of maleic acid anhydride; and
  (3) from 5 to 50 phr of fibers distributed throughout the elastomeric composition.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may optionally have an inside ply or inner fabric layer (not shown), adhered to a drive surface. The belt 20 of FIG. 1 has a fabric backing 27. The fabric backing 27 may be bidirectional, non-woven, woven or knitted fabric. The fabric backing layer 27 may be frictioned, dipped, spread, coated or laminated. The preferred fabric layer 27 is woven or laminated.

The fabrics to be used on the backing layer 27 may be made of conventional materials including nylon (such as nylon 4,6, nylon 6,6 and nylon 6), polyester/rayon, cotton, cotton/rayon, polyester, cotton/polyester, nylon/polyester, cotton/nylon, Lycra™ (segmented polyurethane), aramid, rayon, and the like. Preferably, the fabric is made of cotton/polyester.

The load-carrying section 25 has load-carrying means in the form of load-carrying cords 31 or filaments which are suitably embedded in an elastomeric cushion or matrix 33 in accordance with techniques which are well known in the art. The cords 31 or filaments may be made of any suitable material known and used in the art. Representative examples of such materials include aramids, fiberglass, nylon, polyester, cotton, steel, carbon fiber and polybenzoxazole.

The elastomeric compositions for use in the tension section 21 and cushion section 23 may be the same or different.

The elastomeric composition for use in the load carrying section 25 and/or cushion section 23 contains 100 parts of an elastomer of which 25 to 100 parts by weight is a natural rubber. Preferably, from 25 to 50 parts by weight is a natural rubber. The natural rubber may be any one of the international grades of natural rubber including ribbed smoked sheet, pale crepe, estate brown crepe, compo crepe, thin brown crepe, thick blanket crepe, flat bark crepe and pure smoked blanket crepe.

The remaining or second rubber ranges, from 0 to 75 parts by weight of the elastomer composition. The second rubber is selected from the group consisting of polychloroprene, epichlorohydrin, acrylonitrile rubber, hydrogenated acrylonitrile rubber, synthetic polyisoprene, emulsion and/or solution polymerized styrene-butadiene rubber, styrene-isoprene rubber, isoprene-butadiene rubber, styrene-isoprene-butadiene rubber, 1,4-trans-polybutadiene, chlorosulfonated polyethylene, alkylated chlorosulfonated polyethylene, trans-polyoctenamer, and mixtures thereof Preferably, from 75 to 50 parts by weight of the total 100 parts by weight of elastomer is one or more rubber listed above. Preferably, the rubber is styrene-butadiene rubber.

The elastomeric composition contains from 1 to 30 phr of a polybutadiene adduct of maleic acid anhydrate. Preferably, from 5 to 15 phr is present. The polybutadiene may be a random polybutadiene polymer containing both 1,4 and 1,2 butadiene units. The amount of 1,2 vinyl bonds may range from 15 to about 90 percent by weight 1,2 vinyl bonds. Preferably, from 20 to 70 percent by weight of 1,2 vinyl bonds are present. Preferred adducts are the maleic adduct resins sold by Ricon Resins, a division of Sartomer of Grand Junction, Colorado, under the trademark Ricobond™. Specific examples include Ricobond 1731 (mol weight Mn of approximately 5100 and a viscosity of approximately 500 poise at 45° C.), Ricobond 2031 (mol weight Mn of approximately 5300 and a viscosity of approximately 1000 poise at 55° C.) and Ricobond 1756 (mol weight Mn of approximately 1700 and a viscosity of approximately 1400 poise at 55° C.).

In accordance with a preferred embodiment, the rubber composition containing a mixture of natural rubber and a polybutadiene adduct of maleic anhydride is used in the cushion section of the belt.

The elastomer composition has fibers or flock 35 distributed throughout. This is the case, as shown in FIG. 1, when the elastomer is used in the load-carrying section of the belt. The fibers or flock to be distributed throughout the elastomer mix may be any suitable material and is preferably non-metallic fibers such as cotton or fibers made of a suitable synthetic material including aramid, nylon, polyester, PTFE, fiberglass, and the like. Each fiber may have a diameter ranging between 0.0004 inch to 0.050 inch (0.01 mm to 1.3 mm) and length ranging between 0.001 inch to 0.5 inch (0.025 mm to 12.5 mm). Preferably, the length of the fiber exceeds the diameter. The fibers may be used in an amount ranging from 5 to 50 phr. Preferably, the fibers are used in an amount ranging from 15 to 30 phr.

The orientation of the fibers in the belt compound are achieved by means known to those skilled in the art. In a preferred embodiment, the fibers are oriented in a traverse direction to the belt direction.

Conventional carbon blacks may also be present in the composition. Such carbon blacks are used in conventional amounts ranging from 5 to 250 phr. Preferably, the carbon blacks are used in an amount ranging from 20 to 100 phr. Representative examples of carbon blacks which may be used include those known by their ASTM designations N110, N121, N242, N293, N299, S315, N326, N330, M332, N339, N343, N347, N351, N358, N375, N550, N582, N630, N624, N650, N660, N683, N754, N907, N908, N990 and N991.

It is readily understood by those having skill in the art that the rubber composition would be compounded by methods generally known in the rubber compounding art, such as mixing the various constituent rubbers with various commonly used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

Various non-carbon black fillers and/or reinforcing agents may be added to increase the strength and integrity of the rubber composition for making the power transmission belt of the present invention. An example of a reinforcing agent is silica. Silica may be used in the present composition in amounts from about 0 to 80 parts, and preferably about 10 to 50 parts, by weight based on 100 parts of rubber.

In addition to the above, solid inorganic lubricants may be present in the mixture of natural rubber and polybutadiene adduct. Representative examples of such lubricants include molybdenum disulfide, PTFE, molybdenum diselenide, graphite, antimony trioxide, tungsten disulfide, talc, mica, tungsten diselenide and mixtures thereof The amount of such solid inorganic lubricants, if used, will generally range from 1 to 25 phr.

The rubber composition containing the natural rubber for use in the belt requires a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking, the amount of sulfur vulcanizing agent ranges from about 0.1 to about 8 phr with a range of from about 1.5 to about 6 being preferred.

Conventional rubber additives may be incorporated in the rubber stock of the present invention. The additives commonly used in rubber stocks include non-carbon black fillers, plasticizers, curatives, processing oils, retarders, antiozonants, antioxidants and the like. The total amount of non-carbon black filler that may be used may range from about 10 to about 80 phr. Fillers include silicas, clays, calcium carbonate, calcium silicate and titanium dioxide. The preferred non-carbon black filler is silica. When used in the load-carrying section, plasticizers, oils or mixtures thereof are conventionally used in amounts ranging from about 2 to about 100 phr with a range of about 5 to about 70 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products, cumarone-indene resins and esters such as dibutylphthalate and tricresyl phosphate. Examples of oils are commonly known as highly aromatic process oil, process soybean oil and highly paraffinic process oil. Materials used in compounding which function as an accelerator-activator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred. Another conventional rubber additive which may be present is an anti-reversion agent. Examples include Perkalink™ 900 and Duralink™ HTS. These additives are generally present in an amount ranging from 0.25 to 10 phr.

Accelerators may be used to control the time and/or temperature required for vulcanization of the rubber stock. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof Specific examples of such antidegradants are disclosed in *The Vanderbilt Rubber Handbook* (1990), Pages 282 through 286. Antidegradants are generally used in amounts from about 0.25 to about 5.0 phr with a range of from about 1.0 to about 3.0 phr being preferred.

The mixing of the rubber composition can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and polymeric resin are mixed in one or more non-productive mix stages. The terms "non-productive" and "productive" mix stages are well known to those having skill in the rubber mixing art.

Vulcanization of the composition for use in the belt is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

As known to those skilled in the art, power transmission belts may be built on a drum device. First, the backing is applied to drum as a sheet. Next, any tension section is applied as a sheet followed by spiralling onto the drum the cord or tensile members (load-carrying section). Thereafter, the cushion section is applied followed by the fabric. The assembled laminate or slab is then removed from the drum, placed in a mold, cured and cut into the belts in a manner known to those skilled in the art.

In the following example, physical tests were conducted for uncured and molded compounds. Properties of the vulcanized rubbers were measured according to the following test protocols: MDRs by ASTM D5289-95; hardness by ASTM D2240-97; specific gravity by ASTM D297-93; tear die C strength by ASTM D624-98; tensile properties by ASTM D412-98a; with the modification that the rate of grip separation was six (6) inches per minute to accommodate the fiber loading of the belts (see U.S. Pat. No. 5,610,217); and dynamic testing data by ASTM D5992-96. The fiber orientation was assessed by the ratio of the physical properties in the with direction (machine direction) to the physical properties in the against direction (perpendicular to the machine direction).

EXAMPLE

In this example, a polybutadiene adduct of maleic acid anhydride was evaluated in a rubber compound particularly suited for use in the load-carrying section of a belt.

Rubber compositions containing the materials set out in Table 1 were prepared in a BR Banbury™ mixer using two separate stages of addition (mixing); namely one non-productive mix stage and one productive mix stage.

The rubber compositions are identified herein as Samples 1 through 3. Samples 1 and 2 are considered herein as representative of the present invention. Sample 3 is considered as the control.

The samples were cured at about 151° C. for about 30 minutes. The samples tested for their dynamic properties were cured an additional 15 minutes.

Table 2 illustrates the behavior and physical properties of the cured Samples 1 through 3.

TABLE 1

|  | | | Control |
|---|---|---|---|
|  | Sample 1 | Sample 2 | Sample 3 |
| First Non-productive | | | |
| SBR[1] | 70 | 70 | 70 |
| Natural rubber | 30 | 30 | 30 |
| Polybutadiene adduct of maleic acid anhydride[2] | 4.67 | 4.09 | 0 |
| Zinc 2-mercapto-toluimidazole | 2 | 2 | 2 |
| Aromatic oil | 15 | 15 | 15 |
| Carbon black (N-550) | 25 | 25 | 25 |
| Carbon black (N-762) | 25 | 25 | 25 |
| Polymerized 1,2-dihydro-2,2,4-trimethylquinoline | 2 | 2 | 2 |
| Stearic acid | 1 | 1 | 1 |
| Antidegradant[3] | 2.5 | 2.5 | 2.5 |
| Zinc oxide | 5 | 5 | 5 |
| 1,3-bis(citraconimidomethyl)benzene[4] | 1 | 1 | 1 |
| Silica | 50 | 50 | 50 |
| Polyethylene glycol | 3 | 3 | 3 |
| Chopped polyester[5] | 21 | 18 | 20.55 |
| Productive | | | |
| Insoluble sulfur | 3 | 3 | 3 |
| N-(cyclohexylthio)phthalimide | 0.25 | 0.25 | 0.25 |
| 2-(4-morpholinothio)-benzothiazole sulfenamide | 1.6 | 1.6 | 1.6 |

[1]Emulsion polymerized styrene butadiene rubber commercially available from The Goodyear Tire & Rubber Company under the designation Pliofex ® 1502.
[2]Ricobond 1731
[3]Paraphenylenediamine type
[4]Perkalink ™ 900 commercially available from Flexsys
[5]Chopped 4 mm polyester fiber commercially available from Victor Gelb under the designation M81035

TABLE 2

|  | Control Samples | | |
|---|---|---|---|
|  | 1 | 2 | 3 |
| MDR 1°, 3 min. at 191° C. | | | |
| Test time (min) | 3 | 3 | 3 |
| ML (dNm) | 4.02 | 4.3 | 3.21 |
| MH (dNm) | 21.07 | 23.21 | 21.86 |
| Ts1 (min) | 0.35 | 0.28 | 0.41 |
| T90 (min) | 1.57 | 1.54 | 1.92 |
| S' at T90 (dNm) | 19.37 | 21.32 | 20 |
| Cure rate (dNm/min) | 20.16 | 21.07 | 14.2 |
| MDR 1°, 30 min. at 171° C. | | | |
| Test time (min) | 30 | 30 | 30 |
| ML (dNm) | 4.52 | 4.09 | 2.88 |
| MH (dNm) | 25.2 | 24.58 | 22.18 |
| Ts1 (min) | 0.55 | 0.43 | 0.82 |
| T90 (min) | 6.21 | 6.15 | 6.1 |
| S' at T90 (dNm) | 23.13 | 22.53 | 20.25 |
| Cure rate (dNm/min) | 7.47 | 6.95 | 4.98 |
| Hardness, Shore A | 89 | 89 | 83 |
| Specific gravity | 1.264 | 1.262 | 1.257 |
| Tear Strength, Die C-Against | | | |
| Peak stress (kN/m) | 44 | 47.4 | 50.67 |
| Tear Strength, Die C-With | | | |
| Peak stress (kN/m) | 56.75 | 53.99 | 52.48 |
| Tensile Strength (152 mm/min)-Against | | | |
| Peak stress (MPa) | 8.15 | 8.93 | 8.57 |
| Elongation (%) | 257 | 294 | 332 |
| 5% modulus (MPa) | 1.21 | 1.27 | 0.87 |
| 10% modulus (MPa) | 1.75 | 1.82 | 1.20 |
| 15% modulus (MPa) | 2.12 | 2.15 | 1.46 |
| 20% modulus (MPa) | 2.39 | 2.41 | 1.66 |
| 25% modulus (MPa) | 2.57 | 2.61 | 1.84 |
| 50% modulus (MPa) | 3.12 | 3.11 | 2.37 |
| 100% modulus (MPa) | 4.06 | 3.9 | 3.08 |
| 200% modulus (MPa) | 6.71 | 6.47 | 5.19 |
| 300% modulus (MPa) | 0 | 0 | 7.63 |
| Tensile Strength (152 mm/min)-With | | | |
| Peak stress (MPa) | 11.63 | 10.51 | 11.02 |
| Elongation (%) | 37 | 148 | 120 |
| 5% modulus (MPa) | 4.47 | 4.63 | 4.41 |
| 10% modulus (MPa) | 6.71 | 6.37 | 6.1 |
| 15% modulus (MPa) | 8.91 | 8.27 | 7.85 |
| 20% modulus (MPa) | 11.04 | 10.14 | 9.7 |
| 25% modulus (MPa) | 10.9 | 10.43 | 10.89 |
| 50% modulus (MPa) | 0 | 8.41 | 9.16 |
| 100% modulus (MPa) | 0 | 9.26 | 8.73 |
| Ratio With/Against Tensile Test T10 (152 mm/min) | | | |
| Peak stress | 1.43 | 1.18 | 1.28 |
| Elongation (%) | 0.14 | 0.50 | 0.36 |
| 5% modulus | 3.69 | 3.64 | 5.09 |
| 10% modulus | 3.84 | 3.5 | 5.1 |
| 15% modulus | 4.2 | 3.85 | 5.37 |
| 20% modulus | 4.63 | 4.21 | 5.84 |
| 25% modulus | 4.24 | 4 | 5.92 |
| 50% modulus | 0 | 2.7 | 3.86 |
| 100% modulus | 0 | 2.37 | 2.83 |
| Dynamic Properties | | | |
| Dynamic Stiffness | | | |
| 10 Hz (kN/m) | 997.22 | 1000.04 | 911.32 |
| 20 Hz (kN/m) | 1046.47 | 1044.94 | 950.86 |
| 30 Hz (kN/m) | 1070.67 | 1062.39 | 968.13 |
| 40 Hz (kN/m) | 1090.13 | 1078.97 | 984.15 |
| 50 Hz (kN/m) | 1113.74 | 1089.42 | 1002.74 |
| 60 Hz (kN/m) | 1130.03 | 1112.93 | 1013.63 |
| 70 Hz (kN/m) | 1144.03 | 1127.01 | 1026.96 |
| 80 Hz (kN/m) | 1156.97 | 1128.36 | 1037.91 |

TABLE 2-continued

|  | Control Samples | | |
|---|---|---|---|
|  | 1 | 2 | 3 |
| Tan Delta | | | |
| 10 Hz | 0.2262 | 0.2331 | 0.2415 |
| 20 Hz | 0.2261 | 0.2307 | 0.238 |
| 30 Hz | 0.2251 | 0.2287 | 0.233 |
| 40 Hz | 0.2282 | 0.2317 | 0.2324 |
| 50 Hz | 0.2281 | 0.2319 | 0.2316 |
| 60 Hz | 0.2291 | 0.2335 | 0.2302 |
| 70 Hz | 0.2266 | 0.2308 | 0.2280 |
| 80 Hz | 0.2273 | 0.2282 | 0.2271 |
| Total Energy | | | |
| 10 Hz (J) | .138 | .143 | .134 |
| 20 Hz (J) | .145 | .147 | .138 |
| 30 Hz (J) | .148 | .149 | .138 |
| 40 Hz (J) | .149 | .150 | .137 |
| 50 Hz (J) | .151 | .150 | .138 |
| 60 Hz (J) | .152 | .152 | .138 |
| 70 Hz (J) | .152 | .152 | .138 |
| 80 Hz (J) | .151 | .148 | .136 |

The above data demonstrates that use of Samples 1 and 2 would result in a single V-grooved power transmission belt having improved properties versus use of Control Sample 3. For example, dynamic stiffness is a property in which higher values are desired because the higher the values the more resistant the belt will be to turning over in its pulleys. Looking at the dynamic stiffness values for Samples 1 and 2, one can see higher values are obtained versus the Control. Another property that is important in evaluating compounds for use in a belt is tan delta. Tan delta is a measure of internal heat buildup during dynamic stress. Unfortunately, when dynamic stiffness increases, the tan delta values generally increase, which indicates a compound that heats up during dynamic stress. Therefore, if one increases the dynamic stiffness, equal or lower values for tan delta are desired. In the present invention, the majority of tan delta values for Samples 1 and 2 are lower than the Control even through the dynamic stiffness values are increased. Low extension modulus values (5 to 20 percent modulus values) are considered an indication of belt durability. As can be seen, higher modulus values are obtained with the present invention versus Control Sample 3 implying improved durability for the belts of the present invention.

While present exemplary embodiments of this invention and methods of practicing the same have been illustrated and described, it will be recognized that this invention may be otherwise variously embodied and practiced within the scope of the following claims.

What is claimed is:

1. An endless single V-grooved power transmission belt having
    (A) a tension section;
    (B) a cushion section; and
    (C) a load-carrying section disposed between said tension section and cushion section; and the belt containing a sulfur vulcanized elastomeric composition comprising
    (1) 100 parts of a rubber derived from
        (a) 25 to 100 parts by weight of natural rubber;
        (b) 0 to 75 parts by weight of a second rubber selected from the group consisting of polychloroprene, synthetic polyisoprene, epichlorohydrin, acrylonitrile rubber, hydrogenated acrylonitrile rubber, styrene-butadiene rubber, styrene-isoprene rubber, isoprene-butadiene rubber, styrene-isoprene-butadiene rubber, 1,4-trans-polybutadiene, chlorosulfonated polyethylene, alkylated chlorosulfonated polyethylene, trans-polyoctenamer and mixtures thereof;
    (2) from 1 to 30 parts by weight per 100 parts by weight of total rubber (phr) of a polybutadiene adduct of maleic acid anhydride; and
    (3) from 5 to 50 phr of fibers distributed throughout the elastomeric composition.

2. The endless power transmission belt of claim 1 wherein said polybutadiene adduct of maleic acid anhydride contains both 1,4 and 1,2 butadiene units.

3. The endless power transmission belt of claim 2 wherein the amount of 1,2 vinyl double bonds ranges from 15 to 90 percent weight percent 1,2 vinyl.

4. The endless power transmission belt of claim 3 wherein the amount of 1,2 vinyl double bonds ranges from 20 to 70 percent weight percent 1,2 vinyl.

5. The endless power transmission belt of claim 1 wherein said second rubber is styrene-butadiene rubber.

6. The endless power transmission belt of claim 1 wherein said second rubber is emulsion polymerized styrene-butadiene rubber.

7. The endless power transmission belt of claim 1 wherein said elastomer composition is in the cushion section of the belt.

8. The endless power transmission belt of claim 1 wherein said elastomer composition is in the load-carrying section of the belt.

9. The endless power transmission belt of claim 1 wherein said fibers are present in an amount ranging from 15 to 30 phr.

10. The power transmission belt of claim 1 wherein from 5 to 15 phr of said polybutadiene adduct of maleic acid anhydride is present.

11. The power transmission belt of claim 1 wherein said second rubber is present in an amount ranging from 75 to 50 phr.

12. The power transmission belt of claim 1 wherein from 25 to 50 parts by weight is natural rubber.

* * * * *